June 27, 1939.　　　L. J. SPENCER　　　2,163,766
SIFTER AND MIXER DEVICE
Filed Sept. 7, 1935　　2 Sheets-Sheet 1

INVENTOR
LILLIAN J. SPENCER
BY George B. White
ATTORNEY

June 27, 1939. L. J. SPENCER 2,163,766
SIFTER AND MIXER DEVICE
Filed Sept. 7, 1935 2 Sheets-Sheet 2
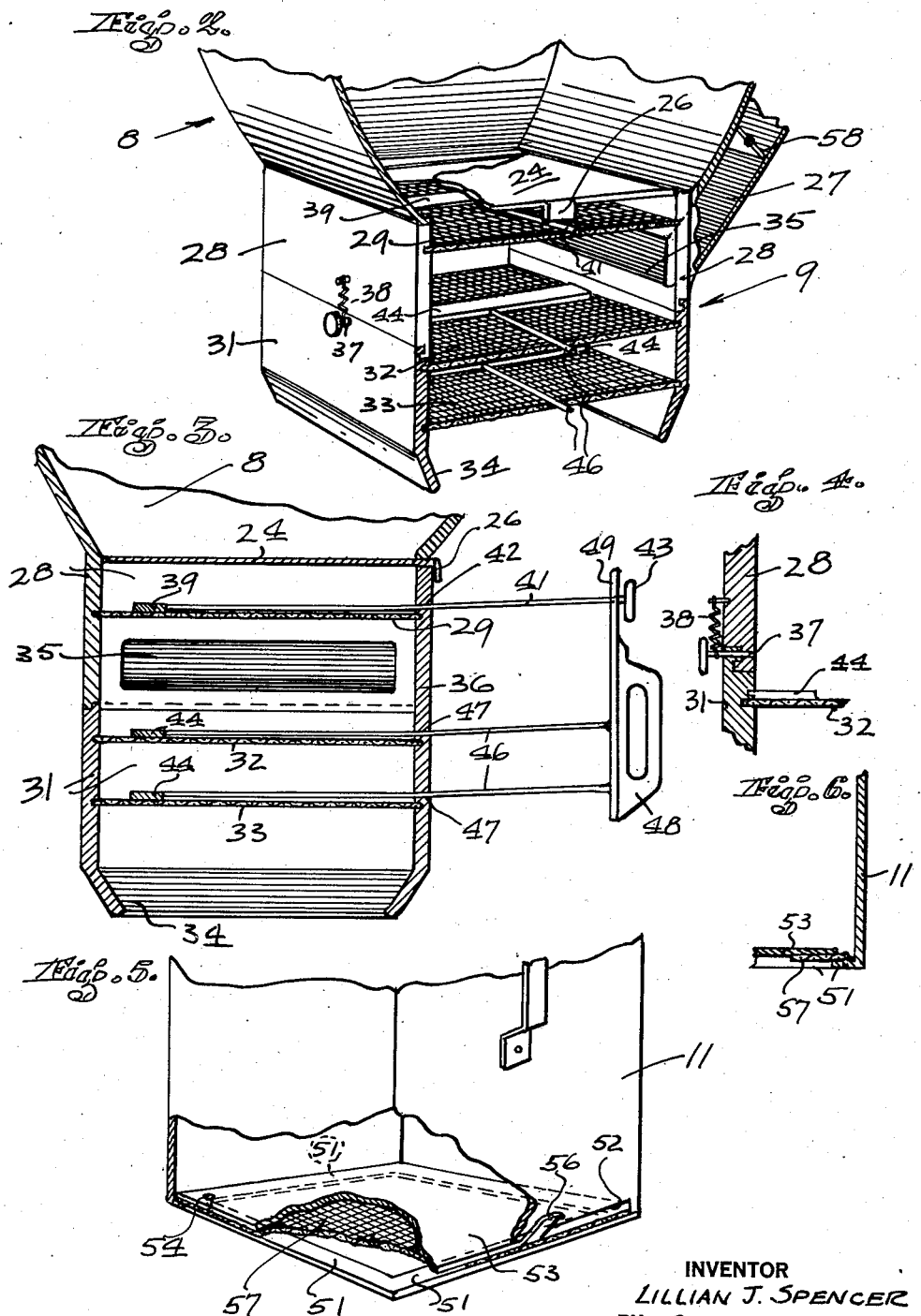
INVENTOR
LILLIAN J. SPENCER
BY George B. White
ATTORNEY Patented June 27, 1939

2,163,766

UNITED STATES PATENT OFFICE 2,163,766

SIFTER AND MIXER DEVICE

Lillian J. Spencer, San Rafael, Calif.

Application September 7, 1935, Serial No. 39,519

2 Claims. (Cl. 209—244)

This invention relates to a sifter box.

The primary object of the invention is to provide a convenient sifter, for flour and the like, arranged in a box so as to contain all the elements necessary for the mixing of the dry ingredients of pastry, cakes, and the like, in a unitary fixture.

Another object of the invention is to provide a unitary fixture which contains a multiple sifter and all the accessories necessary for mixing the dry ingredients for pastry, cakes, and the like, and which is adapted to be kept on the usual kitchen shelf, and is also adapted to contain flour at all times ready for mixing.

Another object of the invention is to provide a multiple sifter for the dry ingredients of pastry or the like, in which said dry ingredients can be sifted selectively through one or more screens in one operation.

A further object of the invention is to provide a measuring cup having a convenient sifter which forms a part of said cup.

Another object of this invention is to provide a household utensil and particularly a mixing and sifting device which is highly useful and simple in construction. Convenience of arrangement, lightness and comparative inexpense of manufacture are further objects which have been borne in mind in the production and development of the invention.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description and specifically pointed out in the appended claims, reference is had to the accompanying drawings for the illustrative embodiment of the invention, wherein:

Figure 1 is a perspective view of my sifting and mixing box with the top cover in the lifted position, and the front cover or door, as well as one side being partly broken away to show the sifter in the box.

Figure 2 is a perspective view, partly in section, of the multiple sifter in my device.

Figure 3 is a sectional view of the multiple sifter.

Figure 4 is a fragmental, sectional view showing the fastening means for the removable screen sections of my sifter.

Figure 5 is a fragmental, perspective view of a measuring cup constructed in accordance with my invention, the various layers of the bottom of said cup being shown broken away so as to show the sifter below the movable bottom of the cup.

Figure 6 is a fragmental, sectional detail view showing the fastening of the bottom elements of the measuring cup.

Figure 10:
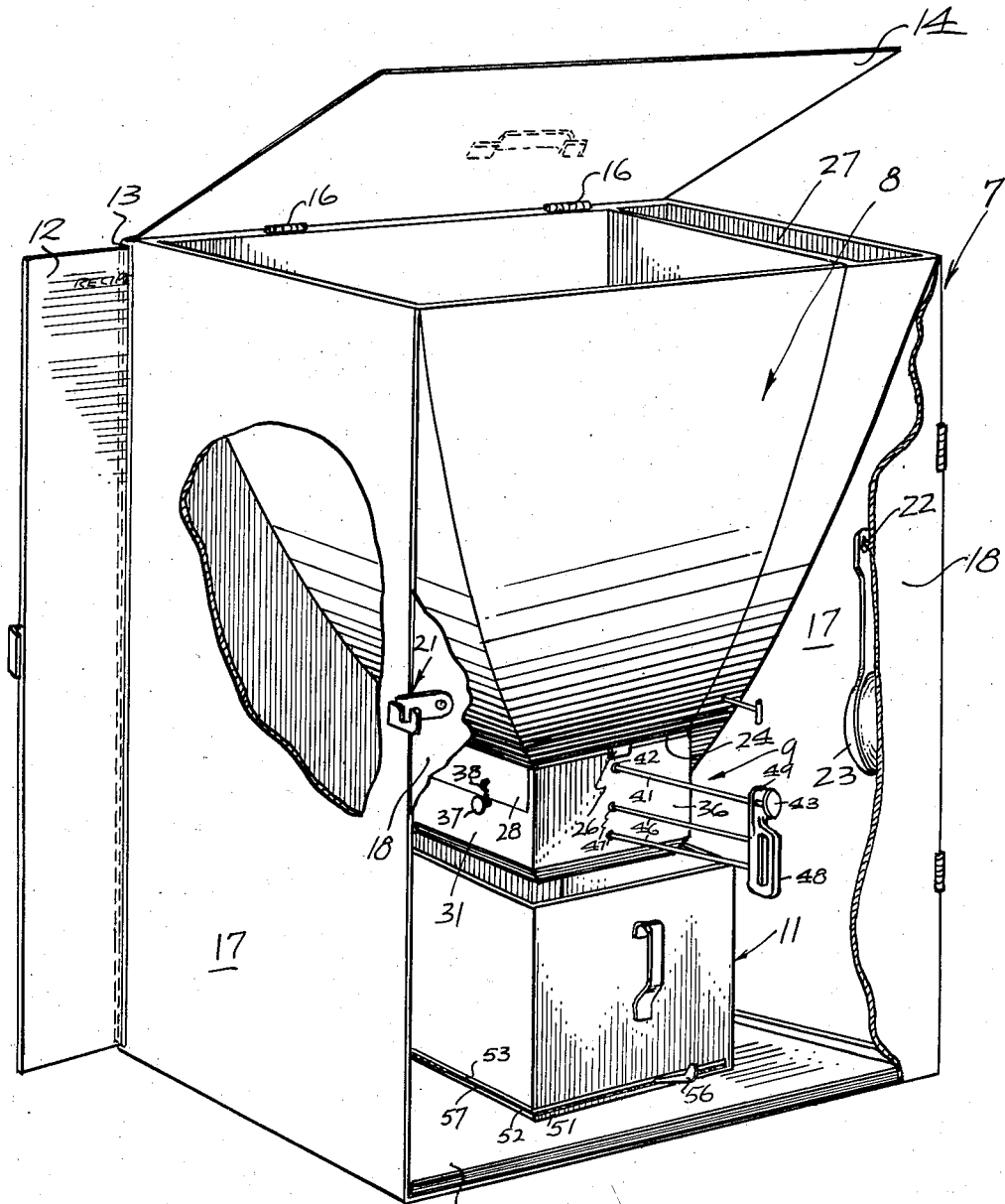

In carrying out my invention I make use in general of a box 7 in which is located a hopper 8 open at its top. On the bottom of the hopper 8 is a multiple sifter 9 below which is a receptacle such as a measuring cup 11. It is to be understood that any receptacle or vessel such as a bowl may be placed below the sifter 9 to receive the sifted dry ingredients therein. A permanent recipe plate 12 is slidably concealed in a rear double wall 13 of the box 7. A cover 14 is hinged at 16 to the top of the rear wall 13 of the box 7.

In detail the box 7 has side walls 17 and a preferably hinged door 18 in the front. On the bottom of the box is placed a removable tray 19. It is also to be noted that the door 18 of said box 7 can be secured in place by a suitable latch such as the type indicated at 21. On the inside face of the door are provided a plurality of prongs or hooks 22 for holding accessories such as small measuring spoons 23 hung thereon.

The upper edge of the hopper 8 coincides with the top edges of the box 7. The hopper 8 has downwardly converging sides which may be either of curved or straight cross-section. At the lower opening of the hopper 8 is provided a slide plate 24 with an ear 26 at its front edge whereby it can be pulled out so as to allow the dry ingredients to drop out of the hopper 8 and into the sifter 9. The hopper also preferably includes an auxiliary chute 27 on one side thereof which leads to the second stage of the multiple sifter 9. This chute 27 is utilized only when it is necessary that certain dry ingredients, such as baking powder, be introduced into the flour only after the flour was sifted once, or in case where only part of the flour contained in the hopper 8 is utilized at one time.

The multiple sifter 9 includes side and rear casing walls 28, the top of which is adapted to slidably support the slide plate 24. Spaced below the slide plate 24 is suitably mounted the uppermost or first stage sifter screen 29. The lower edges of the sides 28 are so grooved as to slidably interlock with the top edges of the sides 31 of a detachable frame in which latter are suitably mounted the second and third sifting screens 32 and 33 one below the other. The lower ends of the walls 31 of this lower section are tapered inwardly toward the outlet opening 34. It is to be noted that the front wall 36 of this lower section extends above the lower section so as to cover the open front of the upper sifter section. Structure of the type herein described facilitates assembly and also if so desired permits the use of any selected number of stages of sifting screens by merely changing the lower section of the multiple sifter unit 9. The walls 31 of the lower section are locked to the walls 28 by any suitable means such as by use of a dowel pin 37 which is extended through alined holes in the respective walls 28 and 31. To facilitate the handling of this dowel pin 37 it is supported on a suitable coil spring 38 which latter is secured to the outside of the respective side 28.

The outlet opening 35 of the chute 27 is through the adjacent wall 28 of the sifter unit 9, and it is located between the levels of the upper screen 29 and the second screen 32. A suitable agitator 39 rests on the top of the screen 29 and is movable back and forth on said screen, by means of a handle rod 41, which latter extends through an aperture 42 in the front wall 36. The rod 41 terminates in a button 43 to facilitate the manipulation of the agitator 39. A similar agitator 44 is provided on each of the lower screens 32 and 33. A rod 46 extends from each agitator 44 slidably through apertures 47 in the front wall 36. The rods 46 are fastened to a suitable handle 48. It is to be noted that the handle 48 has an upwardly extended apertured ear 49, and the upper rod 41 extends through said ear 49 so that the rod 41 may be moved either independently of the handle 48, or the button 43 may be gripped to the handle 48 and then all agitators can be manipulated as a unit.

The measuring cup 11 is of a unique structure so as to allow a separate sifting operation directly from the cup 11, if so desired. The bottom of the cup 11 is open, but it has inwardly extending bottom flanges 51. At two adjacent sides the cup is provided with slots 52 above the respective flanges 51. A bottom plate 53 is inserted through the slots 52 so as to normally form a solid closure at the bottom of the cup 11. The plate 53 is pivotally held on a vertical pivot 54 at a corner at one end of one of the slots 52 so that the plate 53 can be moved into and out of closing position around said pivot 54 and through said slots 52 in a horizontal plane. A suitable ear or handle 56 facilitates the manipulation of the plate 53. A sifting screen 57 is secured on said flanges 51 below the plate 53 so that the plate 53 acts as an agitator when moved back and forth around its pivot 54 thereby directly sifting flour or the like through the bottom of the measuring cup 11.

The entire unit herein described is a closed box of about the size of the usual containers on a kitchen shelf. In order to prepare and mix the dry ingredients for pastry or the like, the recipe plate 12 is pulled out and held in sight by the rear wall 13 of the box 17. Then the door is opened and the flour and other dry ingredients are measured by the cup 11 and by the spoons 23 and are dumped into the hopper 8. Then any suitable vessel such as a usual bowl is placed on the tray 19. Then the slide plate 24 is pulled forward and the sifter agitators are moved forward and backward by means of the handle 48 and button 43. As the dry ingredients are thus worked through the screens 29, 32, and 33, they are sifted as many times as the number of screens in the sifter 9.

In the event the flour is to be sifted by itself once before mixing with the other dry ingredients, then the flour is placed in the hopper 8, but the other dry ingredients, such as sugar, baking powder and the like, are placed separately in the chute 27, and introduced only at the second screen 32. Any suitable means such as butterfly plate 58 may be used to control the flow from the chute 27. The upper agitator 39 may be used separately from and then together with the lower agitators 44 so as to accomplish the proper mixing of all the ingredients.

The sifter unit 9 can be readily cleaned by removing the dowel pin 37 and then the lower section can be pulled out and cleaned, and, if necessary replaced by a similar lower unit with different number of screens therein.

The agitators 39 and 44 are resiliently held against the upper faces of the respective screens 29, 32 and 33 by reason of the outward and upward incline or slant of the respective guide holes 42 and 47, and the slight resiliency of the respective handle bars or rods 41 and 46. As the rods 41 and 46 are pushed inwardly over the respective screens the above inclined guide holes hold the same down onto the respective screens.

The device herein described may be finished in any attractive color to be in harmony with the usual sets of similar household fixtures. It may be set on a working table or board, or it may be hung on a nail, or the like, on a wall by means of a suitable loop or hook that may be formed on the outside of the rear wall 13. The device is of a unitary character, it does not require any adjustments, and it can be operated easily by any unskilled person.

I claim:

1. In a device of the character described, a multiple sifter comprising a frame, a plurality of sifter elements arranged in the frame in spaced series one above the other, an agitator for each sifter element, means for manipulating the said agitators on the respective sifter elements, a hopper to conduct a substance to be sifted onto the uppermost sifter element, and a chute means to introduce other substances onto one of the lower sifter elements of the series, and means to control the introduction of the substances from the said chute means onto the said lower sifter element.

2. In a device of the character described, comprising a frame open at its top and bottom, a plurality of sifter elements arranged in the frame in spaced series one above the other, an agitator for each sifter element, selective means for manipulating either one or all of the said agitators, the said selective means comprising a rod member extending from the uppermost agitator and having a button secured on its outer end, rod members extending from the other of said agitators and the outer ends of the said rods of the other agitators being secured to a handle member, and the rod of the uppermost agitator extending through an aperture in the upper portion of the said handle member, and means to conduct substances to be sifted onto the uppermost sifter element.

LILLIAN J. SPENCER.